Figure 1:
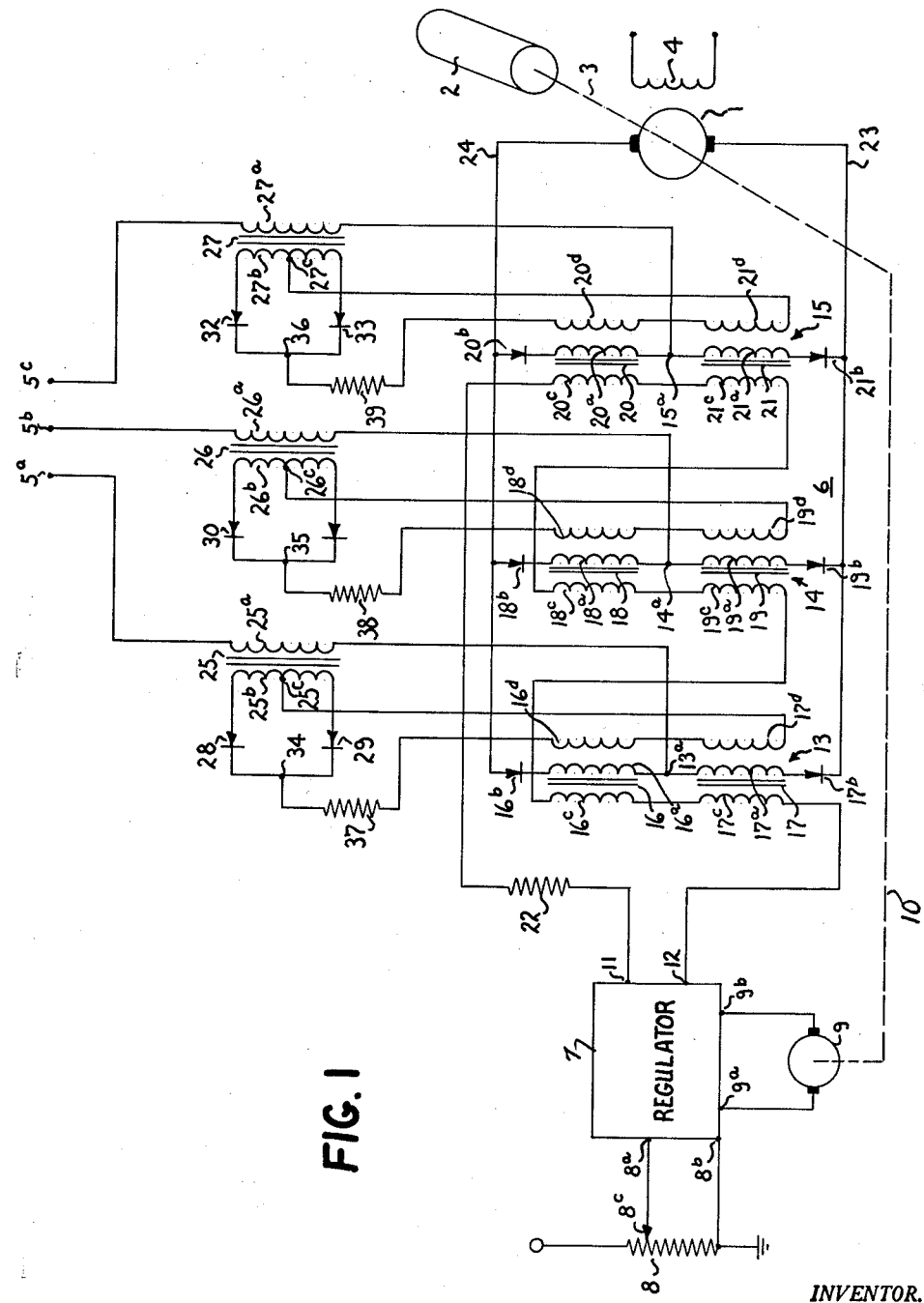

Feb. 12, 1963  C. E. GRAF  3,077,556
ELECTRIC DRIVE
Filed July 10, 1961  2 Sheets-Sheet 1

INVENTOR.
CARLTON E. GRAF
BY Robert H Montgomery
ATTORNEY

Feb. 12, 1963 C. E. GRAF 3,077,556
ELECTRIC DRIVE
Filed July 10, 1961 2 Sheets-Sheet 2

INVENTOR.
CARLTON E. GRAF
BY Robert H. Montgomery
ATTORNEY

United States Patent Office 3,077,556
Patented Feb. 12, 1963

3,077,556
ELECTRIC DRIVE
Carlton E. Graf, Lawrence Park, Erie, Pa., assignor to General Electric Company, a corporation of New York
Filed July 10, 1961, Ser. No. 123,064
10 Claims. (Cl. 318—448)

This invention relates to electric power-translating devices, and more particularly relates to polyphase magnetic amplifiers arranged to supply electrical energy to a variable dynamic load.

The invention is particularly suited for use in regulated electric drives and is disclosed in that environment. A regulated electric drive generally comprises a motor for driving a load, a controllable power-translating device supplying electrical energy to the motor, and a pre-amplifier or regulator which supplies a control error signal to the power-translating device which is the resultant of an input reference signal indicative in magnitude of a desired level of a motor characteristic and a feedback signal indicative in magnitude of the actual level of the motor characteristic. The regulated motor characteristic may be torque, speed, etc. This type of regulated drive is generally referred to as a closed loop system.

A closed loop electric drive system as described, particularly high gain, low percent regulation systems, presents a stabilizing problem when the motor load is rapidly varied, inasmuch as a transient signal having a short rise or fall time is introduced in the feedback circuit which produces a corresponding transient error signal in the forward portion of the system. The motor and control circuitry, because of mechanical and electrical time constants, cannot immediately respond to and follow such signals during the time duration of the error signal change.

Therefore, the regulated motor characteristic may oscillate or hunt about the desired level before approaching and holding the desired characteristic level. When the drive reacts in this manner, it is considered to have poor stability or be unstable.

When a regulated electric drive utilizes a magnetic amplifier as the power-translating device, stability becomes a serious concern due to the inherently high gain of the magnetic amplifier which may allow a small change in error signal to cause a large corresponding surge in the electrical energy supply to the motor, tending to overaccelerate the motor, thus causing a tendency towards system instability.

An effective technique of combatting this instability problem is to provide degenerative or negative feedback about the magnetic amplifier to cushion any change in electrical energy supplied the motor. Where negative current feedback is used, the load current is made more linear with respect to the magnetic amplifier control ampere-turns and change in load current tends to be at a controlled linear rate. One feature of this invention resides in the provision of a new and improved magnetic amplifier current feedback technique.

Another problem found in polyphase magnetic amplifiers, particularly at low voltage output levels, is unbalance in the portion of the load carried by each phase of the magnetic amplifier. At low voltage output levels, where the firing of the magnetic amplifier occurs towards the end of the alternating current (A.C.) cycle, unless the cores are very closely matched, one or more phases of the magnetic amplifier may stop firing and the remaining phase or phases are required to carry more of the load and energy is supplied to the motor in a pulsating manner, resulting in torque pulsations on the motor shaft which is highly undesirable where a constant torque is required to be exerted on the load.

The present invention is intended to overcome and alleviate the aforementioned limitations and deficiencies of prior art polyphase magnetic amplifiers and similar problems of operationally similar power-translating devices by the provision of new and improved stabilizing current feedback means which also effects automatic phase balancing.

Accordingly, it is a primary object of this invention to provide an improved polyphase electric power-translating device, particularly a magnetic amplifier for supplying electrical energy to a dynamic load.

Another object of this invention is to provide a magnetic amplifier for use in regulated electric drives which contributes to drive system stability and provides automatic balancing of phases.

A further object of this invention is the provision of a magnetic amplifier in a regulated electric motor drive which allows the use of a regulator of smaller rating and providing a simple current limit function.

Briefly stated, the invention in one form thereof comprises detecting the magnitude of the current in each of the A.C. lines supplying the magnetic amplifier phases and applying a degenerative feedback signal to the magnetic core of each phase proportional to A.C. line current. This negative current feedback stabilizes the overall drive system by making load current a function of control ampere-turns, and further, the independent degenerative feedback on the cores of each phase accomplishes automatic phase balancing.

The novel features of the invention are particularly pointed out and definitely claimed in the claims appended to and forming a part of this specification. However, the invention, together with its organization and operation, and further objects and advantages thereof, may be best appreciated from the following description taken in conjunction with the following drawings wherein—

Figure 2:
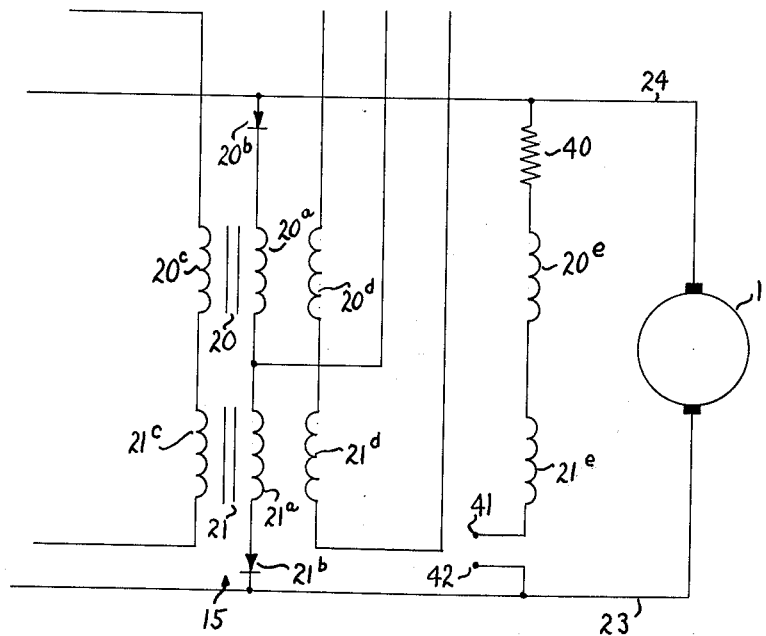

FIGURE 1 illustrates a speed-regulated electric drive embodying the invention, and FIGURE 2 illustrates, by modification of FIGURE 1, a further feature of the invention.

FIG. 1 shows an electric drive, illustrated as a speed-regulated drive. The drive comprises a direct current (D.C.) motor 1 arranged to drive a load illustrated as a roller 2, through a shaft 3. The load 2 may drive a conveyor belt or strip material in a continuous processing line. The motor 1, which, for simplicity of disclosure, is assumed to be operated only in its base speed range, has its field 4 excited from a source of constant voltage, not shown.

Electrical energy is supplied to the armature circuit of motor 1 from a three-phase alternating current (A.C.) source, not shown, from A.C. terminals 5a, 5b, 5c through a three-phase magnetic amplifier 6 having its output connected to the motor armature circuit. The magnetic amplifier and the A.C. source are represented as three-phase, in view of the common use of three-phase systems; however, the invention is applicable to an $n$ phase electric power-translating device.

The drive system further comprises an amplifier hereinafter referred to as speed regulator 7 which receives a speed reference signal input from a voltage reference source, represented by potentiometer 8, and a motor speed indicative signal illustrative as derived by tachometer generator 9. The reference signal is applied to regulator input terminals 8a, 8b, and the speed signal is applied to regulator input terminals 9a, 9b. The potentiometer 8 is adapted to be connected to a reference voltage source, not shown, and the setting of potentiometer arm 8c determines the magnitude of the speed reference signal, and hence the speed at which motor 1 is to be operated and regulated. In practice, the reference voltage source may be some device furnishing a signal varying in accordance with some program set in accordance with a work cycle of the load driven by the motor. The tachometer 9 is driven by the motor 1 through connection 10 which may represent a geared or pulley drive or mounting of the tachometer 9 on the motor armature shaft. The tachometer 9 being driven at a speed proportional to motor speed furnishes a signal also proportional thereto.

The regulator 7, which may be comprised of well known elements, compares the speed reference signal from potentiometer 8 and a motor speed indicative signal from tachometer 9 to derive a speed error signal indicative in polarity and magnitude of any deviation in motor speed from the regulated speed and the direction of such deviation. The regulator 7, which may be comprised of a magnetic amplifier, transistors, vacuum tubes, etc., in accordance with one aspect of the invention as hereinafter disclosed, provides a current limit function. The regulator 7 will amplify the derived speed error signal and supply it to control windings of magnetic amplifier 6 connected across regulator output terminals 11 and 12. A suitable regulator of the transistor type is shown in the copending application on Ernest F. Kubler and Richard W. Wolke, Serial No. 847,925, filed October 22, 1959, and assigned to the same assignee as the present invention.

Magnetic amplifier 6 is illustrated as being of the three-phase, self-saturating, full wave type. Each of the phases 13, 14 and 15 of the magnetic amplifier 6 comprises a pair of magnetic cores 16, 17; 18, 19 and 20, 21 respectively. Each core, 16 through 21, has a load or gate winding 16a through 21a respectively thereon, and unidirectional conducting devices 16b through 21b respectively in series therewith. The magnetic cores 16 through 21 are preferably of the toroidal type because of the relatively higher magnetic efficiency of this type core with respect to other type cores.

Each of the cores 16 through 21 also has a control winding 16c through 21c respectively thereon, each having predetermined number of turns and all being connected in series with a resistance 22 and across output terminals 11 and 12 of regulator 7. The value of resistance 22 is selected to produce a predetermined value of ampere-turns in control windings 16c—21c, dependent on the output voltage of regulator 7, and suppresses any currents induced in control windings 16c—21c by the gate windings. Each of terminals 5a, 5b and 5c is connected to terminals 13a, 14a and 15a between the gate windings of each phase 13, 14 and 15 of magnetic amplifier 6. The positive D.C. output terminals of the magnetic amplifier phases 13, 14 and 15 are connected to line 23 and the negative D.C. terminals of phases 13, 14 and 15 are connected to line 24. Lines 23 and 24 are connected across the armature of motor 1.

Although not illustrated, the magnetic amplifier 6 also has the conventional bias windings on each of the cores 16 through 21 connected to a reference voltage source, not shown, to set a predetermined magnetic bias on the cores. The operation of the drive system including the magnetic amplifier 6 thus far described is well known to those skilled in the art and need not be explained in any detail.

Briefly, the control windings 16c through 21c produce a number of ampere-turns in each core 16 through 21 respectively, dependent on the magnitude and polarity of the error signal at regulator output terminals 11 and 12. The greater the positive ampere-turns of the control windings, the less is the number of ampere-turns of the load windings required to saturate the cores and the load windings conduct earlier in the cycle of the A.C. wave applied thereto and the magnetic amplifier produces a greater voltage across the motor armature circuit. Conversely, when the control winding ampere-turns are of such small value that the load windings conduct only near the end of the A.C. cycle, a low voltage is produced across the motor armature circuit.

At low motor armature voltage values, where the cores of each phase 13, 14 and 15 are not matched or accurately matched with respect to magnetic characteristics and capacity, one or more of the phases may not conduct and the remaining phase or phases carries all the motor armature current which results in current and hence torque pulsations which are undesired, especially where the motor 1 is driving a constant torque load.

The inherently high gain of magnetic amplifiers, as previously mentioned, tends to introduce stability problems in a closed loop system of the type illustrated, particularly where magnetic cores having rectangular hysteresis characteristics are utilized, as in the present illustration wherein toroidal cores are used. It is well known in the amplifier art that degenerative feedback about an amplifier will help stabilize operation of the amplifier at some sacrifice in amplifier gain.

In accordance with the present invention, a combination degenerative current feedback and automatic phase balancing system is provided which stabilizes the overall drive system and also balances the current in the phases which, while advantageous at all-motor voltages, is especially important at low motor voltages.

The invention provides means for deriving from each phase a signal indicative of the load current supplied by that phase. As illustrated, current transformers 25, 26 and 27 are provided in each of the alternating phases connecting terminals 5a, 5b and 5c to terminals 13a, 14a and 15a respectively. Each current transformer 25, 26 and 27 has a primary winding 25a, 26a and 27a, and center-tapped secondary windings 25b, 26b and 27b, the center taps being indicated as 25c, 26c and 27c, all respectively.

Connected across each secondary winding 25b, 26b and 27b are similarly poled rectifiers 28, 29; 30, 31; 32, 33; each pair having common anode connection points 34, 35 and 36 respectively. Serially connected between point 34 and center tap 25c are resistor 37 and windings 16d and 17d on cores 16 and 17 respectively. Serially connected between point 35 and center tap 26c are resistor 38 and windings 18d and 19d on core 18 and 19 respectively. Likewise, resistor 39 and windings 20d and 21d on cores 20 and 21 respectively are connected between point 35 and center tap 26c. The function of resistors 37, 38 and 39 is to suppress any currents induced in windings 16d—21d by the gate windings and also to set the number of ampere-turns in the degenerative feedback windings at rated load current.

Each of the feedback windings 16d—21d are poled in the turn-off direction with respect to control windings 16c—21c, and it may thus be seen that each magnetic amplifier phase 13, 14 and 15 has its own degenerative current feedback circuit, thereby providing negative current feedback about the magnetic amplifier which tends to make the load current a linear function of the control ampere-turns, thus adding stability to the system. The current transformers 25, 26, and 27 are selected to provide a predetermined number of ampere-turns in feedback windings 16d—21d at rated load current.

The rectified output of each of the current transformers which is proportional to the alternating current in the associated line, produces degenerative ampere-turns, with respect to control windings 16c—21c, on the cores of the magnetic amplifier phase connected to the line from which it is derived, thus additionally providing automatic phase balancing. The phase tending to draw more or less current than the others degenerates itself more or less because of its stronger or weaker feedback ampere-turns.

It will be noted, in view of the negative current feedback, that more control ampere-turns (windings 16c—21c) are required to produce rated motor voltage at rated load. By way of illustration only, if 20 ampere-turns are required in each of windings 16c—21c to produce rated motor voltage across lines 23 and 24 at no load, and negative feedback windings 16d—21d produce 20 ampere-turns at full load, there are insufficient net control ampere-turns in the turn-on direction to produce rated output voltage when the motor is loaded. This problem could be overcome by using a regulator of greater output rating to increase the turn-on control ampere-turns; however, such solution to this problem would require a higher rated, more expensive regulator.

Therefore, in accordance with another aspect of the invention, positive voltage feedback is provided about the magnetic amplifier to supplement the regultoar output. FIG. 2 illustrates such an arrangement. In FIG. 2, for simplicity, the positive voltage feedback is illustrated only in conjunction with phase 15 of FIG. 1, and the identifying numerals of FIG. 2 identify like elements to those of FIG. 1. Positive voltage feedback windings 20e and 21e are shown provided on cores 20 and 21 respectively of magnetic amplifier phase 15 and connected across lines 23 and 24 in series with resistor 40 which sets the current in the positive feedback circuit, and hence the positive voltage ampere-turns in windings 20e, 21e and other positive voltage feedback windings, not shown, on magnetic amplifier cores 16—19, not shown in FIG. 2, which are in series with points 41 and 42.

Referring back to the illustrative numerical example, if the value of resistor 40 and the turns of the positive voltage feedback windings are selected to produce 15 ampere-turns in windings 20e and 21e and other positive feedback windings on cores 16—19 in the turn-on direction at rated voltage to supplement the ampere-turns on the control windings, then the regulator 7 is only required to produce 25 ampere-turns in the control windings to provide a net 20 control ampere-turns in the turn-on direction at rated voltage and load. Thus, the regulator 7 need only produce a difference of 5 ampere-turns to produce rated voltage across the armature as between full load and no-load.

From the foregoing, it will be seen that, by virtue of the provision of negative current feedback, load current becomes a linear function of control current, and therefore load current may be limited by limiting control current. This is accomplished very simply and economically by designing the regulator so that the maximum regulator output voltage (saturation voltage) produces a predetermined maximum control current through the series circuit comprising control windings 16c—21c and resistance 22. For example, if the output circuit of the regulator comprises a transistor stage, this stage can be designed to produce a maximum voltage which produces a maximum control current in the series circuit comprising control windings 16c—21c and resistance 22. Inasmuch as the negative current feedback makes D.C. load current a linear function of control ampere-turns, the voltage limit placed on or designed into the regulator 7 sets a current limit on the magnetic amplifier. If the regulator 7 comprises a magnetic amplifier, it may be so designed that when it is saturated by its control ampere-turns, it produces a predetermined maximum voltage output. Regulators composed of other circuit elements may similarly be designed for a predetermined maximum voltage output to establish a current limit on an electric drive in accordance with the invention. If an extremely sharp current limit is desired, a clamp may be placed on the output of the regulator 7 as described in the aforementioned copending application of Ernest F. Kubler and Richard W. Wolke. This arrangement provides a simplified and economical motor acceleration current limit control.

An additional advantage of the invention is that the use of the independent current feedback and phase balancing technique disclosed enables the strength of the negative feedback to be easily adjusted to fit the requirements of a particular electric drive using a magnetic amplifier or other controllable power-translating device.

While features of the invention have been described in one embodiment thereof, other modifications, changes, and embodiments of the invention may occur to those skilled in the art which do not depart from the spirit and scope of the invention. Accordingly, it is intended to cover in the appended claims all modifications and changes in the embodiments herein chosen for purposes of disclosure which do not depart from the spirit and scope of the invention.

What is claimed as new and desired to secure by Letters Patent of the United States is:

1. A regulated electric drive comprising: a direct current motor; a polyphase magnetic amplifier for supplying direct current to a circuit of said motor from an alternating current source, said magnetic amplifier comprising in each phase, a saturable magnetic core, a gate winding, a control winding and a feedback winding thereon, said gate windings connected across a circuit of said motor, said control windings being connected in series; an amplifier for providing a regulated control signal to said control windings to control saturation of said cores, means for providing a reference signal to said amplifier indicative in magnitude of a motor characteristic to be regulated, means for providing a signal to said amplifier indicative of the regulated characteristic whereby said amplifier compares the reference and indicative signals and provides an error signal to said control windings in response thereto; a line for connecting each phase of said magnetic amplifier to an alternating current phase, means for deriving from each of said lines a direct current signal proportional to the alternating current in that line and applying the derived direct current signal to the feedback winding on the associated magnetic core whereby the current in each alternating current line provides a degenerative feedback signal to its associated magnetic amplifier phase proportional to the alternating line current to thereby cause the current in said motor circuit to be a linear function of the output of said regulator.

2. The electric drive of claim 1 wherein the motor circuit is the motor armature circuit and the regulator is designed to have a predetermined maximum output voltage to thereby establish a predetermined current limit on the magnetic amplifier direct load current.

3. The electric drive of claim 1 where the motor circuit is the motor armature circuit and each magnetic core is provided with an additional winding thereon, said additional windings are connected in series across the output of said magnetic amplifier and so poled as to provide regenerative ampere-turns in their associated cores proportional to motor armature voltage to supplement the ampere-turns of said control windings.

4. A regulated electric drive comprising: a direct current motor; a polyphase magnetic amplifier for supplying direct current to the motor armature circuit from an alternating current source, said magnetic amplifier comprising in each phase, a saturable magnetic core, a gate winding, a control winding and a feedback winding thereon, said gate windings being connected across a circuit of said motor, said control windings being connected in series; an amplifier for providing a regulated control signal to said control windings to control saturation of said cores, means for providing a reference signal to said amplifier indicative in magnitude of a motor characteristic to be regulated, means for providing a signal to said amplifier indicative of the regulated characteristic whereby said amplifier compares the reference and indicative signals and provides an error signal to said control windings in response thereto; a line for connecting each phase of said magnetic amplifier to an alternating current phase, a current transformer in each of said lines having a primary and a center-tapped secondary winding, rectifying means connected to said secondary windings, the feedback winding on each of said cores being connected between the rectifiers and the center tap of the current transformer of its associated phase whereby the current in each alternating current line provides a degenerative feedback signal to its associated magnetic amplifier phase proportional to the alternating line current to cause the current in said armature circuit to be a linear function of the output of said regulator.

5. A regulated electric drive comprising: a direct current motor; a polyphase magnetic amplifier for supplying direct current to the motor armature circuit from an alternating current source, said magnetic amplifier comprising in each phase, a saturable magnetic core, a gate winding, a control winding and a feedback winding thereon, said gate windings being connected across a circuit of said motor, said control windings being connected in series; an amplifier for providing a regulated control signal to said control windings to control saturation of said cores, means for providing a reference signal to said amplifier indicative in magnitude of a motor characteristic to be regulated, means for providing a signal to said amplifier indicative of the regulated characteristic whereby said amplifier compares the reference and indicative signals and provides an error signal to said control windings in response thereto; a line for connecting each phase of said magnetic amplifier to an alternating current phase, a current transformer in each of said lines having a primary and a center-tapped secondary winding, rectifying means connected to said secondary windings, the feedback winding on each of said cores being connected between the rectifiers and the center tap of the current transformer of its associated phase whereby the current in each alternating current line provides a degenerative feedback signal to its associated magnetic amplifier phase proportional to the alternating line current to cause the current in said armature circuit to be a linear function of the output of said regulator, said regulator having a predetermined maximum output voltage to thereby establish a predetermined current limit on the magnetic amplifier direct load current.

6. A regulated electric drive comprising: a direct current motor; a polyphase magnetic amplifier for supplying direct current to the motor armature circuit from an alternating current source, said magnetic amplifier comprising in each phase, a saturable magnetic core, a gate winding, a control winding and a feedback winding thereon, said gate windings being connected across a circuit of said motor, said control windings being connected in series; an amplifier for providing a regulated control signal to said control windings to control saturation of said cores, means for providing a reference signal to said amplifier indicative in magnitude of a motor characteristic to be regulated, means for providing a signal to said amplifier indicative of the regulated characteristic whereby said amplifier compares the reference and indicative signals and provides an error signal to said control windings in response thereto; a line for connecting each phase of said magnetic amplifier to an alternating current phase, a current transformer in each of said lines having a primary and a center-tapped secondary winding, rectifying means connected to said secondary windings, the feedback winding on each of said cores being connected between the rectifiers and the center tap of the current transformer of its associated phase whereby the current in each alternating current line provides a degenerative feedback signal to its associated magnetic amplifier phase proportional to the alternating line current to cause the current in said armature circuit to be a linear function of the output of said regulator, each magnetic core being provided with an additional winding thereon, said additional windings being connected in series across the output of said magnetic amplifier and so poled as to provide regenerative ampere-turns in their associated cores proportional to motor armature voltage to supplement the ampere-turns of said control windings.

7. A polyphase magnetic amplifier for supplying direct current to a dynamic load from an alternating current source, said magnetic amplifier comprising in each phase, a saturable magnetic core having a gate winding, a control winding and a feedback winding thereon, said gate windings connected across a circuit of said dynamic load, said control windings being connected in series; means for providing a control signal to said control windings to control saturation of said cores; a line for connecting each phase of said magnetic amplifier to an alternating current phase, means for deriving from each of said lines a direct current signal proportional to the alternating current in that line and applying the derived direct current signal to the feedback winding on the associated magnetic core whereby the current in each alternating current line provides a degenerative feedback signal to its associated magnetic amplifier phase.

8. A polyphase magnetic amplifier for supplying direct current to a dynamic load from an alternating current source, said magnetic amplifier comprising in each phase, a saturable magnetic core having a gate winding, a control winding and a feedback winding thereon, said gate windings connected across a circuit of said dynamic load, said control windings being connected in series; means for providing a control signal to said control windings to control saturation of said cores; a line for connecting each phase of said magnetic amplifier to an alternating current phase, a current transformer in each of said lines having a primary and a center-tapped secondary winding, rectifying means connected to said secondary windings, the feedback winding on each of said cores being connected between the rectifiers and the center tap of the current transformer of its phase whereby the current in each alternating current line provides a degenerative feedback signal to its associated magnetic amplifier phase.

9. A regulated electric drive comprising a direct current motor, a controllable polyphase power-translating device for supplying direct current to a motor circuit from an alternating current source, said device providing $n$ parallel unidirectional current paths to said motor circuit from an $n$ phase alternating source, a control circuit for controlling the time of conduction of each of said paths, a regulator for providing a regulated control signal to said control circuit to control the conduction time of each of said paths, means for providing a reference signal to said regulator indicative in magnitude of the motor characteristic to be regulated, means providing a signal to said regulator indicative of the regulated characteristic whereby said amplifier compares the reference and indicative signals and provides an error signal to said control circuit in response thereto, a line for connecting each phase of said translating device to an alternating current phase, means for deriving from each of said lines a direct current signal proportional to the alternating current in that line and applying the derived direct current signal to said control circuit of each path whereby the current in each alternating current line provides a degenerative feedback signal to the control circuit of its associated current path.

10. An $n$-phase magnetic amplifier, each phase comprising a pair of magnetic cores having a load winding thereon, said load winding pairs connected in series, rectifying means in series with each of said load windings, an alternating current supply line adapted to be connected to a terminal point between said load windings, said series connected load windings and associated rectifying means providing direct current output terminals at opposite ends thereof adapted to be connected across a direct current load, each of said $n$-phases of said magnetic amplifier being connected in parallel across said direct current terminals, control windings on each of said cores adapted to receive a control signal to set the magnetic saturation level of said cores to determine the voltage at said direct current terminals, a degenerative feedback winding on cores of each phase, means to obtain a signal proportional in magnitude to the current in each magnetic amplifier phase and means for applying the current proportional signal of each phase to the degenerative feedback windings on the cores of the associated phase.

References Cited in the file of this patent
UNITED STATES PATENTS
3,046,464    Miller _____ July 24, 1962